United States Patent [19]

Hons-Olivier et al.

[11] 4,266,039

[45] May 5, 1981

[54] FIREPROOF ELASTIC PACKING MATERIAL

[75] Inventors: Jacques P. Hons-Olivier, Paris; Tri Le Thanh, La Garenne Colombes; François M. Devanz, Paris, all of France

[73] Assignee: Impervia, Societe d'Etudes et de Realisations, Courbevoie, France

[21] Appl. No.: 118,685

[22] Filed: Feb. 5, 1980

Related U.S. Application Data

[63] Continuation-in-part of Ser. No. 810,778, Jun. 28, 1977, abandoned.

[30] Foreign Application Priority Data

Jul. 2, 1976 [FR] France ............................. 76 20217

[51] Int. Cl.³ .............................................. C08J 9/00
[52] U.S. Cl. ...................................... 521/85; 521/91; 521/92; 521/98; 521/907; 260/DIG. 24
[58] Field of Search ........................... 521/85, 91, 907

[56] References Cited

U.S. PATENT DOCUMENTS

| | | | |
|---|---|---|---|
| 2,650,206 | 7/1953 | Stock | 260/2.5 FP |
| 2,804,398 | 8/1957 | Hooks | 428/921 |
| 2,880,183 | 3/1959 | Weissert | 260/2.5 FP |
| 2,947,647 | 7/1960 | Hart et al. | 260/2.5 FP |
| 2,984,640 | 5/1961 | Kaplan | 260/2.5 FP |
| 2,993,017 | 7/1961 | Sucetti | 260/29.6 MN |
| 3,021,293 | 2/1962 | Simon | 260/2.5 FP |
| 3,033,804 | 5/1962 | Bethe et al. | 260/2.5 FP |
| 3,037,951 | 6/1962 | Basto et al. | 260/2.5 FP |
| 3,090,764 | 5/1963 | Ellis | 260/DIG. 24 |
| 3,663,267 | 5/1972 | Moran et al. | 428/921 |
| 3,826,762 | 7/1974 | Treadwell | 521/85 |
| 4,160,073 | 7/1979 | Lloyd-Lucas | 521/85 |

*Primary Examiner*—Morton Foelak
*Attorney, Agent, or Firm*—Darby & Darby

[57] ABSTRACT

A shapeable, fireproof, elastic packing material suitable for packing joints and the like in the form of a paste or shaped structure which is elastic at low temperature and is capable of swelling at high temperature, e.g. in a fire, to form a solid gas impenetrable barrier. The elastic packing material contains an elastomer, a vulcanizing agent and an intumescent mineral.

24 Claims, No Drawings

FIREPROOF ELASTIC PACKING MATERIAL

This application is a continuation-in-part of my copending application Ser. No. 810,778, filed June 28, 1977 now abandoned.

This invention pertains to fireproof compositions suitable for use as elastic packing or sealing materials and to their preparation. In particular, the invention relates to such compositions which are capable of swelling at high temperatures thereby maintaining packing or sealing efficiency in the event of a fire.

One of the most difficult problems to be solved in the field of fire protection is the maintenance at very high temperatures of the gas impervious barrier seals provided by elastomer-based materials that are widely used as construction elements; for example, as seals in doors or partitions, on vertical faces, in interstices, for example, between plates of concrete, or in floors of all kinds in the horizontal plane. This problem arises not only in stationary structures such as residential and commercial buildings, but also in transport vehicles, particularly ships.

It is a known fact that in a fire the propagation of the flames very frequently results from the passage of air or burning gas through interstices (e.g., between the edge of a door and the door frame) where the seals did not withstand the high temperature.

The difficulty consists in the fact that the seals used to obtain a tight sealing fit at ordinary temperature must be elastic in order to effectively prevent the passage of air or gas; and with this in mind, such seals previously been made with a base of vulcanized elastomers so as to possess sufficient elasticity to insure proper tightness. But elastomer-based seals are combustible, and in spite of the addition of fireproof fillers or of certain other products, they break down or may even burn when subjected to temperatures on the order of 200 deg. C. or more. This is the reason such seals, when exposed to the elevated temperatures that occur in fires and which quickly exceed 400 deg. C. are only effective for a brief period of time before breaking down and permitting the flame front to pass. Their effective lifespan after commencement of a fire is usually insufficient to permit help to arrive.

The subject of the present invention is a new packing or seal with a base of vulcanized elastomer, which is elastic at ordinary temperature. However, when the seal of the invention is burned by decomposition or combustion, it continues to serve as a sealing agent in the interstice or space in which it is located, because by reason of its composition, it has undergone, in spite of the combustion of the elastomer, an increase in volume and the remaining composition, instead of being in a powdered state without cohesion, continues to completely fill the interstice or joint in the form of a non-elastic skeleton, which very effectively prevents the passage of air or of burning gases.

As a result, the period of resistance to fire of elements equipped with such seals is considerably increased.

The seal according to the invention consists, first of all, of an elastomer supplemented by the usual vulcanizers for such elastomer, so that it will possess the necessary elasticity at ambient temperatures. To the elastomer composition there can also be added all of the optional conventionally employed ingredients for elastic seals, particularly fillers such as hydrated alumina and/or kaolin in fine powder form, and antioxidizing products to retard aging.

Secondly, the seal composition of the invention contains non-dehydrated vermiculite, or a similar mineral having a laminated or porous structure, and thirdly, a vitrifying agent which insures cohesion of the inorganic elements remaining after combustion of the elastomer.

It was found that if a composition containing vermiculite is subjected to very high temperature increases, such as those occurring in a fire, and in any event temperatures higher than 200 deg. C., there will be considerable effects of swelling or creep. This property has been utilized in the prior art for the preparation of surface coatings to protect the material on which such coatings are applied. Such coatings retard the rate at which the outside temperature is transmitted to the material thus coated, but do not constitute seals situated in interstices so that the latter will be sealed and closed up, even at high temperature, making the passage of air or burning gases impossible.

This transformation of the vermiculite occurs only at high temperatures, and in any event, temperatures far above those used for the manufacture of the elastic linings coming within the composition of structural elements by vulcanization of elastomer-based compositions.

Under such conditions, the presence of natural vermiculite does not alter the qualities of elasticity of the seal at ordinary temperature.

This circumstance is utilized according to the present invention, to provide an elastic packing with a vulcanized elastomer base which can be put in place, at ordinary temperatures, as in the case of conventional elastomer seals, but which insures at elevated temperatures (after combustion of the elastomer), a tightness of the interstice or joint due to the swelling of the vermiculite.

It was also found by the inventors that the presence in the composition of a vitrifying product, that is to say, one producing an agglomeration at high temperature of the inorganic products resulting from the combustion of the elastomer, and in particular, of the fillers and of the dehydrated vermiculite, makes it possible to prevent these products, under the conditions of high temperature to which they are exposed, from being in the state of loose powder and escaping from the seal or interstice due to their weight and/or the currents of air or hot gases.

Thus, according to the invention, the parking is prepared by the mixture of three main constituents, namely: an elastomer supplemented by vulcanizing agents serving as a binder; vermuculite constituting the swelling element; and a vitrifying product. Secondary products particularly fireproofing materials or inert fillers can also be added to the packing composition as optional ingredients.

The term elastomer as employed herein refers to any substance having physical properties, particularly elastic properties, comparable to that of rubber.

As the elastomer constituent of the invention, it is possible to employ any compound used for the manufacture of synthetic rubber, and particularly the halogenated elastomers such as polychloroprenes, which are preferred, and to which are added any vulcanizing agent. Suitable elastomers also include natural rubber, styrene-butadiene rubber, nitrile acrylic butadiene rubber, ethylene propylene diene monomer, isobutylene rubber and silicone elastomers. The elastomers are preferably employed in their halogenated form, but may also be used in combination with fireproofing agents to delay combustion of the elastomer until the vermiculite has begun to swell. Thus, for example, chlorinated butadiene polymers and chlorinated copolymers of styrene and butadiene are suitable for use in the invention, with polychloroprene being a preferred elastomer. As vulcanizers, it is possible to use substances insuring hot vulcanization of the elastomer, such as magnesium oxide or 2 mercaptomidazoline, or substances insuring vulcanization at ambient (room) temperature, such as 1-3 diethylthiourea. With these elastomers it is also possible to combine fireproofing products to retard their combustion, such as, in particular, hydrated alumina, chlorinated paraffin, antimony trioxide and inert fillers such as kaolin.

It is also possible to add blowing or foaming agents to the elastomer compositions (i.e., any substance which, when added to the elastomer composition, will transform it under the influence of heat, at the time of vulcanization, into a microcellular foam.

The second main constituent is vermiculite or a similar laminated rock which, under the influence of very high heat, produces the swelling. The vermiculite or a similar mineral, is added in the proportion of 4% to 30% of the total weight of the mixture formula. A smaller proportion would yield insufficient results; a larger proportion would make the mixture difficult to treat in mixers or plasticizing machines in order to obtain good homogeneity. Relative to the elastomer, the proportion of vermiculite can vary from 10 to 100% by weight, but is preferably between about 35 and 50%. The best results are obtained by using natural vermiculite (i.e., non-dehydrated) is finely divided form; in practice, the size of the vermiculite grains or particles will not exceed 0.1 mm in diameter. In use, the vermiculite does not begin to swell until a temperature above about 200°C. is reached (i.e. a temperature above the decomposition temperature of the elastomer). However, this swelling action would be of no value in creating a useful seal, if the packing (or joint) did not retain the approximate form as it swells. Hence, a vitrifying agent is an important constituent of the invention.

The third main constituent of the invention is a vitrifier. Suitable vitrifiers for use in the invention are selected from the phosphoric esters of the alkylaryl type, such as isodecyldiphenyl phosphate or 2-ethylhexyldiphenylphosphate which vitrify with heat and prevent pulverization of the vermiculite and filler to ashes in the high temperature conditions that may occur in a fire. These esters are oily liquids at ambient temperatures, but under the influence of high temperature (above about 200°–250° C.) serve as a matrix or cohering agent for the inorganic substances of the invention which remain after combustion of the elastomer. Thus, the function of the vitrifier is important, because after the disappearance at very high temperature of the elastomer and the other decomposable products, the vitrifier serves as a cohering agent and keeps the vermiculite and other non-combustion mineral substances of the composition in place.

Vitrifying agents such as those referred to above produce this effect only at high temperatures, beyond which the organic products are burned; and although it is not possible to provide an unquestionable, scientific explanation of this effect, they appear to embody an agglomeration of the dehydrated vermiculite and the elements remaining after the period of combustion, in particular mineral fillers such as kaolin.

Preparation of an elastic lining or joint material according to the invention is accomplished by working the ingredients together in a mixing device. The selected vulcanizers, fireproofing materials, vermiculite, the vitrifier and fillers, where applicable, are gradually incorporated in the elastomer by admixing the ingredients together in a mixing apparatus.

The compositions are prepared in the form of fairly rigid shapes or profiles. Thus, the composition prepared in this way can be passed through a plasticizing machine or a calender to shape it to a particular form or profile, for example, flat strips or sheets. Pieces can also be shaped to a predetermined form by molding.

These profiles, or, where applicable, the moldings, are then vulcanized at a temperature on the order of about 160 deg. C., that is to say, generally between 150 and 170 deg. C., as is well known for the vulcanization of synthetic rubber compositions. At this relatively moderate temperature, the vermiculite remains intact, without the production of any considerable swelling. The profile obtained has a definite shape, but exhibits a more or less accentuated elasticity, depending on the proportion of filler incorporated in the elastomer.

A variation of the manufacture consists in employing vulcanizers producing their effect, as is known, without heating, at ambient temperature; for example 1-3 Diethylthiourea. In such a case, a material should be preserved by refrigeration until used, in order to avoid premature vulcanization.

By way of example, the following formulas can be employed to formulate elastic seals, for example in the form of strips:

FIRST EXAMPLE

| Polymer: | Polychloroprene | | 100 | 100 gr. |
|---|---|---|---|---|
| | | Magnesium oxide | 4 | |
| | | Stearic acid | 1 | |
| | Vulcanizers: | Zinc oxide | 5 | 11 gr. |
| | | 2 mercaptoimidazoline | 1 | |
| | Antioxidants: | Phenyl beta Naphthylamine | 2 | 2 gr. |
| | | Hydrated alumina | 40 | |
| | Fireproofing Agents | Chlorinated paraffin | 10 | 63 gr. |
| | | Antimony trioxide | 5 | |
| | | Decabromo Dipheny | 8 | |
| | Filler | Kaolin | 40 | 40 gr. |
| Swelling Agent | | Vermiculite | 40 | 40 gr. |
| Vitrifying Agent | | Isodecyldiphenylphosphate | 15 | 15 gr. |
| | | | Total | 271 gr. |

SECOND EXAMPLE

| | | |
|---|---|---|
| Polymer: | Neoprene WRT | 100.00 |
| | Magnesium oxide | 4.00 |
| | Stearic acid | 0.50 |
| Vulcanizers: | 2 mercaptoimidazoline | 0.80 |
| | Zinc oxide | 5.00 |
| | -4-4' dicumyl diphenylamine | 1.00 |
| Antioxidants: | N-isopropyl N'phenyl-paraphenylene-dimaine | 1.00 |
| | Carbon black | 60.00 |
| Filler: | Kaolin | 40.00 |
| | Diethylene glycol | 2.00 |
| Swelling Agent: | Vermiculite | 40.00 |
| Vitrifier: | Isodecyl diphenyl phosphate | 20.00 |
| | Total | 274,30 |

THIRD EXAMPLE

| | | |
|---|---|---|
| Polymer: | Chlorosulfonated Polyethylene | 100.00 |
| | Carbonate of magnesia | 15.00 |
| | Lead protoxide | 15.00 |
| Vulcanizers: | Dipentamethyline thiourea tetrasulfide | 1.50 |
| | Benzothiozyl disulfide | 0.50 |
| | Nickel Dibutyldithio Carbonate | 2.00 |
| | Antimony trioxide | 5.00 |
| Fireproofing: | | |
| | Alumina hydrate | 20.00 |
| | Carbon black | 12.00 |
| Filler and Lubricant: | Kaolin | 35.00 |
| | Chlorinated paraffin | 10.00 |
| Swelling agent: | Vermiculite | 40.00 |
| Vitrifying agent: | 2-ethylhexyl 2-diphenyl phosphate | 18.00 |
| | Total | 274.00 |

FOURTH EXAMPLE

| | | |
|---|---|---|
| Polymer: | Polychloroprene | 100.00 |
| | Zinc oxide | 5.00 |
| Vulcanizers: | Magnesium oxide | 4.00 |
| | Mercaptoimidazoline | 1.00 |
| Fireproofing Agents: | Alumina Hydrate | 45.00 |
| | Antimony Trioxide | 5.00 |
| | Kaolin | 50.00 |
| Filler: | Silica | 15.00 |
| | Calcium Carbonate | 50.00 |
| Swelling Agent: | Vermiculite | 50.00 |
| Vitrifying Agent: | Isodecyl Diphenylphosphate | 15.00 |
| | Total | 340.00 |

With these compositions, vulcanization is conducted at 160 deg. C.

FIFTH EXAMPLE

| | | | | |
|---|---|---|---|---|
| Polymer: | Polychloroprene | | 100 | 100 gr. |
| | | Magnesium oxide | 4 | |
| | Vulcanizers | Stearic acid | 1 | |
| | | Zinc oxide | 5 | 11 gr. |
| | | 1-3 Diethylthiourea | 1 | |
| | Antioxidant | Phenyl beta Naphthylamine | 2 | 2 gr. |
| | | Hydrated alumina | 40 | |
| | Fireproofing Agents | Chlorinated paraffin | 10 | |
| | | Antimony trioxide | 5 | 63 gr. |
| | | Decabromo Diphenyl | 8 | |
| | Load | Kaolin | 40 | 40 gr. |
| Swelling Agent: | Vermiculite | | 40 | 40 gr. |
| Vitrifier: | Isodecyldiphenyl phosphate | | 35 | 35 gr. |
| | | | Total | 291 gr. |

With such a composition, which vulcanizes at ambient temperature, it is also possible to prepare a seal paste containing vermiculite, of sufficient moldability, as long as the vulcanization is not complete, to serve for plugging fissures of any form. After vulcanization, the material becomes elastic and the seal material assumes the exact shape of the interstice into which it was inserted.

For other needs it is likewise possible to embody, as a variation of the first example, pieces or profiles of microcellular material, by addition to the composition of an appropriate blowing or foaming agent.

In this case, the following composition can be employed:

SIXTH EXAMPLE

| | | | | |
|---|---|---|---|---|
| Polymer: | Polychloroprene | | 100 | 100 gr. |
| | | Magnesium oxide | 4 | |
| | Vulcanizers | Stearic acid | 1 | |
| | | Zinc Oxide | 5 | 11 gr. |
| | | 2 mercaptoimi-dazoline | 1 | |
| | Antioxidant | Phenyl beta Naphthylamine | 2 | 2 gr. |
| | | Hydrated alumina | 40 | |
| | Fireproofing Agents | Chlorinated paraffin | 10 | |
| | | Antimony trioxide | 5 | 63 gr. |
| | | Decabromo Diphenyl | 8 | |

-continued

|  |  |  |  |  |
|---|---|---|---|---|
|  | Blowing Agent | Alpha - alpha' Azo-di-isobutyronftrile | 10 | 10 gr. |
|  | Filler | Kaolin | 40 | 40 gr. |
| Swelling Agent: | Vermiculite |  | 40 | 40 gr. |
| Vitrifier: | Isodecyl diphenyl phosphate |  | 15 | 15 gr. |
|  |  |  | Total | 281 gr. |

With such a composition, vulcanization is conducted at about 160 deg. C.

The packings thus made, when they are in the form of profiles or molded bodies, can be delivered as such, to be employed by the users who insert them or attach them by any appropriate means in the structural elements whose tightness or protection is to be insured.

These profiles or molded joint pieces can also be applied in advance to structural elements which thus constitute industrial products, ready to be installed for example into a building structure and/or a ship.

Thus, stokehold or alleyway doors on ships and fireguard (anti-fire) partition elements, can be prepared in advance, ready to be mounted and having affixed to the desired points and especially their sealing edge, elastic profiles such as those described above, so that by merely installing the element, partition door or the like, the packing or seal will be positioned in the interstice (or gap) that it is to seal in airtight fashion, especially, for example, in case of fire. By way of example, structural elements such as ceiling tile elements—electrical cabinets—stuffing boxes—fire doors—fire hatches—record files—tubular sheaths and covering pieces—plastic sheaths—sound-insulation elements—cab insulation elements for motors, all including airtight fireproof seals, can be prefabricated for on-site installation.

The elastic joints of the invention have been shown to remain fireproof and gas impermeable at temperatures on the order of 900° C. and above.

What is claimed is:

1. An elastic packing material comprising a shapeable composition which is elastic at low temperature and which swells at high temperature to form a gas impermeable barrier, said composition comprising a vulcanised mixture of a natural or synthetic rubber binder, a vulcanising agent for vulcanising said binder, an intumescent mineral in an amount from about 4 to about 30% by weight of said mixture, and an alkylaryl-phosphate vitrifying agent for vitrifying said intumescent mineral under the action of heat at said high temperature and preventing pulverization of said intumescent material at said high temperature.

2. An elastic packing material according to claim 1 wherein said intumescent mineral is vermiculite.

3. An elastic packing material according to claim 1 wherein said binder is a halogenated binder.

4. An elastic packing material according to claim 3 wherein said halogenated binder is a polychloroprene.

5. An elastic packing material according to claim 3 wherein the proportion of said vermiculite to said binder is between 10% and 100% by weight.

6. An elastic packing material according to claim 5 wherein the proportion of the vermiculite relative to the binder is between 35% and 50% by weight.

7. An elastic material according to claim 3 wherein said vitrifying agent comprises an alkylaryl phosphoric ester.

8. An elastic packing material according to claim 3 which comprises a blowing agent for giving said packing material a microcellular structure.

9. An elastic packing material according to claim 3 wherein said composition includes a fireproofing agent.

10. An elastic packing material according to claim 3 wherein said composition includes an inert filler.

11. A paste for packing joints and cracks comprising unvulcanised mixture of a natural or synthetic rubber binder, a vulcanising agent for said binder active at ambient temperature, and from about 4% to about 30% by weight of said mixture of an intumescent mineral, and an alkylaryl phosphate vitrifying agent for said intumescent mineral.

12. A paste according to claim 11 wherein said intumescent mineral is vermiculite.

13. A paste according to claim 11 wherein said high temperature is about 200 degrees centigrade.

14. A process for manufacturing a shapable elastic packing composition which comprises:
kneading a natural or synthetic rubber binder, with a hot acting vulcanising agent for said binder, 4% to 30% by weight of said composition of an intumescent mineral and an alkaryl phosphate for vitrifying said intumescent mineral at high temperatures, forming said composition containing said vulcanising agent, said binder, said intumescent mineral and said vitrifying agent to a predetermined shape;
vulcanising said predetermined shape at a predetermined vulcanisation temperature whereby the packing composition receives its final form.

15. A process according to claim 14 wherein said vitrifying agent is additionally kneaded with said binder.

16. A process for manufacturing a paste suitable as a shapable elastic packing which comprises:
kneading a natural or synthetic rubber binder, with a vulcanising agent for said elastomer which acts at ambient temperature by time effect to vulcanise said binder, 4% to 30% by weight of said paste of an intumescent-mineral and an alkylaryl phosphate vitrifying agent for said mineral; and
maintaining said admixed vulcanising agent, said binder, said intumescent mineral and said vitrifying agent at a temperature below the vulcanisation temperature of said binder prior to use, so as to avoid premature vulcanisation of said binder.

17. An elastic packing material according to claim 1 wherein said vitrifying agent is alkaryl phosphoric ester.

18. An elastic packing material for packing joints and the like comprising natural or synthetic rubber binder and at least one vulcanising agent for said binder, from about 4% to 30% by weight of said packing of crude vermiculite having a particle size below 0.1 milimeters and an alkylaryl phosphoric ester.

19. An elastic packing material as defined in claim 23 wherein the phosphoric acid ester is a member selected from the group consisting of isodecyl diphenyl phosphate and 2-ethylhexyl diphenyl phosphate.

20. A packing joint having a composition as defined in claim 23 or 24.

21. A paste according to claim 11 wherein said vitrifying agent comprises an alkylaryl phosphoric acid ester which is an oily liquid at ambient temperature and serves as a matrix for cohering said intumescent mineral at temperatures above the combustion temperature of said elastomer.

22. An elastic packing material according to claim 1 wherein said vermiculite begins to swell at a temperature above about 200° C.

23. An elastic packing material for packing joints and the like, comprising natural or synthetic rubber binder with vulcanising agents, from about 4 to 30% by weight of said packing of crude vermiculite of which the granulometry is below 0.1 mm., and phosphoric ester of the alkylaryl type.

24. An elastic packing material for packing joints and the like conforming to claim 23 in which the phosphoric ester is of the group comprising iso decyl diphenyl phosphate and 2-ethylhexyl diphenyl phosphate.

* * * * *